Jan. 8, 1957 E. F. ABEL 2,776,480
SLITTER FOR FRANKFURTERS AND THE LIKE
Filed June 3, 1954

INVENTOR
Ernest F. Abel
BY
Wooster & Davis
ATTORNEYS.

United States Patent Office 2,776,480
Patented Jan. 8, 1957

2,776,480

SLITTER FOR FRANKFURTERS AND THE LIKE

Ernest F. Abel, Ansonia, Conn.

Application June 3, 1954, Serial No. 434,147

2 Claims. (Cl. 30—124)

This invention relates to a slitter for frankfurters and the like, and has for an object to provide a simple and effective means for quickly and easily slitting a frankfurter or the like longitudinally to any desired depth from a side surface thereof.

It is also an object to provide a device of this character with which the frankfurter or the like may be placed on a suitable support, and held thereon while this device may be used for slitting it longitudinally for its full length from the top thereof by merely placing the device over the frankfurter or the like and drawing it longitudinally thereof while it is resting on the support.

A further object is to provide a device of this character which may be easily cleaned and kept in a sanitary condition, and also in which the cutter blade may be readily adjusted for varying or controlling the depth of the cut in the frankfurter or the like.

With the foregoing and other objects in view, I have devised the construction illustrated in the accompanying drawing forming a part of this specification. It is, however, to be understood the invention is not limited to the specific details of construction and arrangement shown but may embody various changes and modifications within the scope of the invention.

In this drawing:

Fig. 1 is a side elevation of this device showing how it is used in slitting a frankfurter or the like;

Figure 1:
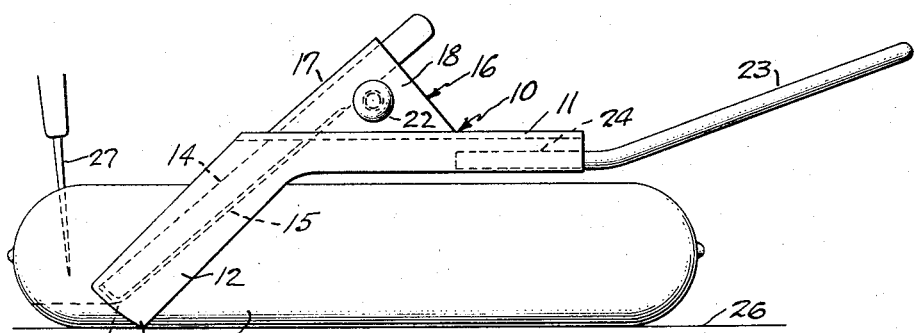
Figure 2:
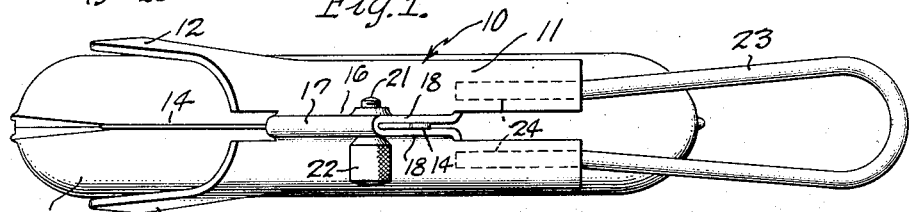
Fig. 2 is a top plan view thereof.
Figure 3:
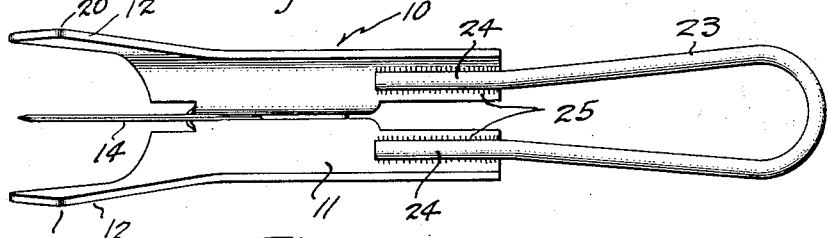
Fig. 3 is a bottom plan view of the slitter.
Figure 4:
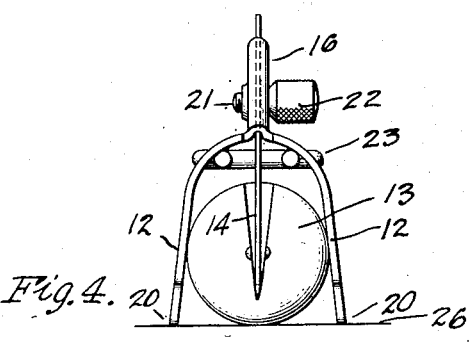
Fig. 4 is an end view looking from the left of Figs. 1 and 2.

It is often quite difficult to longitudinally slit frankfurters and like articles as they are difficult to hold stationary, and it is also difficult to keep the knife used in the slitting operation properly centered on the frankfurter as it is drawn lengthwise thereof and keep it from running out at the side, and particularly is this true when the frankfurter is cold and curved in shape, although it is also difficult when the article has been cooked or is hot. With this device the frankfurther or the like may be placed on a suitable support and quickly and easily slit throughout its length with a central uniform cut by merely drawing this device longitudinally or lengthwise over the frankfurter or the like while it is held on this support. Although it was devised primarily for slitting frankfurters and the like it is not confined to use for slitting meat articles, but could also be used for slitting other similarly shaped articles, such, for example, as frankfurter rolls. Some times "hot dog" stands where a lot of these articles are sold employ a skilled operator for slitting them, but with this device it is not necessary to have a skilled operator, as anyone may readily operate this device and slit the articles easily and quickly as well as uniformly.

The device comprises a body member 10 comprising a substantially horizontal top portion 11, and including at one end downwardly and backwardly inclined laterally spaced side fingers 12 forming a substantially inverted U-shaped guide to embrace a frankfurter or similar article 13. Depending from the top portion 11 adjacent this guide and preferably within the guide between the side fingers 12 is a knife blade 14, and this blade is preferably inclined upwardly and forwardly, as indicated in dotted lines Fig. 1, as in this position it has in effect a longitudinal sliding cutting action of its sharp edge 15 on the article being slit. The body member and the means for mounting the knife may comprise various constructions, but that shown is a very simple and effective one, the body being formed of sheet metal the top portion 11 of which is transversely curved, with the fingers 12 forming an extension at one end of the side portions of this curved top. The knife could be mounted in any suitable structure on the top of the body, but in this case it is mounted in an extension 16 projecting upwardly from the top of the body on substantially its longitudinal center. In the arrangement shown the body is a one-piece construction of sheet metal with the center folded upon itself as shown at 17 to form the extension 16, including opposite side members 18 side by side but laterally spaced sufficiently to receive the knife blade 14 between them, and this blade can be guided and held rigidly in the proper inclined position by its top edge seating at the inner side of the fold 17, which is properly inclined for this purpose. The blade may be adjusted longitudinally in this support to space its lower end 19 at the desired or proper distance above the lower ends 20 of the side fingers 12 to control and vary the depth of cut in the frankfurter or similar article 13. Means is also provided for clamping the blade in different adjusted positions, in the arrangement shown comprising a screw 21 passing through one side of the extension 16 and threaded into the other side, with a knurled head 22 for operating the screw to loosen and tighten it in permitting adjustment of the knife blade and securing it in adjusted position.

At the other end of the body from the guide fingers 12 is provided a handle 23. This may be of different shapes or constructions, but the form of handle shown is a very simple one which may be readily cleaned. It, as shown, comprises a heavy wire or rod bent to substantially U shape with the opposite ends 24 of the sides secured on the under side of the top 11 of the body 10 by any suitable means such, for example, as soldering or welding, as indicated at 25, and this handle, although it may be in substantially the plane of the top of the body, is preferably inclined upwardly as shown in Fig. 1 to give a more natural grip for operating the device and also to provide proper space for the fingers between the handle and the article being slit.

In using the device the article to be slit, in the present case the frankfurter or similar article 13, is placed on a suitable support 26 such, for example, as a meat block, table or cutting board, and held at one end by the fingers of one hand or a suitable fork 27, and by merely placing the device over the frankfurter or the like at this end, as indicated in the drawing, so that the fingers 12 straddle or embrace the article to be cut with the lower ends 20 of the fingers resting on the support 26, the device can be drawn easily and quickly to the right as viewed in Fig. 1 for the full length of the article and slit it easily and quickly for its full length, the device readily following the curve of the frankfurter in slitting such article. The ends 20 of the guide fingers resting on top of the support maintain the device in the proper upright position, insuring a uniform cut or slitting of the article for its full length and to a uniform depth.

It will be seen from the above that the device is of very simple construction and may be readily cleaned and kept in a sanitary condition, that a single simple operation only is required to slit a frankfurter, roll or similar article uniformly and quickly for its full length, and that it is not necessary to have a skilled person for operating this device, but practically anyone can slit a large number of these articles in a short time.

Having thus set forth the nature of my invention, I claim:

1. A slitter for frankfurters and the like comprising a body member including laterally spaced downwardly and rearwardly inclined fingers at one end forming a guide to embrace the opposite sides of a frankfurter on a support, the lower ends of the fingers adapted to rest on the support and slide along the same on opposite sides of the frankfurter to maintain the frankfurter between them, a knife blade projecting downwardly between the fingers, and a handle at the other end of the body member for drawing the guide fingers and blade along the support lengthwise of the frankfurter to slit it longitudinally.

2. A slitter for frankfurters and the like comprising a body member of sheet metal having a transversely curved top portion and the sides at one end being inclined downwardly and laterally forming a substantially inverted U-shaped guide to embrace a frankfurter on a support, said body being folded upon itself intermediate its ends forming an upwardly extending support including spaced side members, a knife blade secured between said side members projecting below the top portion of the body member adjacent the guide, a screw in said side members to clamp the blade in different adjusted positions, and a handle projecting from the other end of the body for drawing it and the blade longitudinally of a frankfurter embraced by the guide to slit it lengthwise.

References Cited in the file of this patent

UNITED STATES PATENTS

| | | |
|---|---|---|
| 2,520,000 | Dettman | Aug. 22, 1950 |
| 2,548,165 | Koch | Apr. 10, 1951 |
| 2,601,724 | Jones | July 1, 1952 |
| 2,675,580 | Pesce | Apr. 20, 1954 |